3,409,543
TREATMENT OF SOUR ORGANIC STREAMS
Peter Urban, Northbrook, and Henry A. Cyba, Evanston, Ill., assignors to Universal Oil Products Company, Des Plaines, Ill., a corporation of Delaware
Filed Apr. 20, 1966, Ser. No. 543,870
10 Claims. (Cl. 208—234)

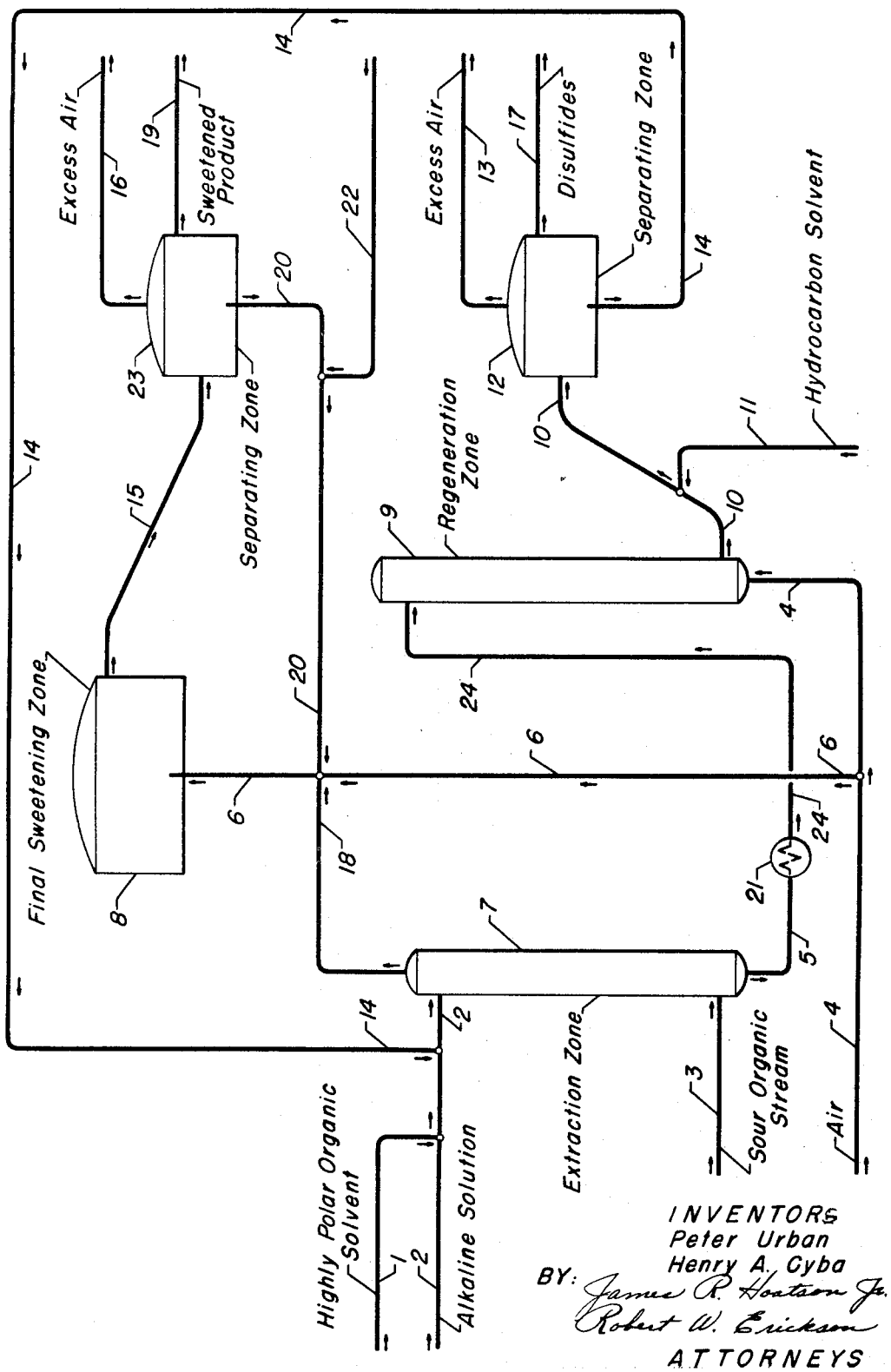

ABSTRACT OF THE DISCLOSURE

Treatment of a mercaptan-containing organic stream with an alkaline solution containing a polar organic solvent, such as dialkyl sulfoxides, amino alcohols, aminohydroxy-alkyl ethers and alkyl amines and amides, oxidizing the resultant mercaptide-rich, polar-organic, alkaline phase in contact with phthalocyanine catalyst, and recycling resultant regenerated polar-organic, alkaline phase to the first-mentioned treating step.

---

The subject of the present invention is a combination process for treating a sour organic stream containing at least one mercaptan component in order to generate a product of reduced mercaptan content and of reduced total sulfur compound content. More precisely, the present invention relates to a combination process for the treatment of a sour organic stream for the purpose of physically removing mercaptans contained therein, which process utilizes a mercaptan extraction step in conjunction with a regeneration step in a continuous manner and in such a fashion as to effectively and efficiently physically remove difficult high molecular weight mercaptans while at the same time making judicious and optimum use of the extractive agents associated with the process. In essence then, the present invention provides a simple but effective means of physically removing high molecular weight mercaptans from a sour organic stream by the use of a specially conceived solvent stream, in combination with a unique means of regenerating the mercaptide laden solvent stream, in such a manner that an effective and efficient closed-loop continuous process is not only possible but highly desirable. For particularly difficult streams containing high molecular weight mercaptans that possess low intrinsic rates of extraction, referenced to the specially conceived solvent streams discussed hereinafter, the present invention also encompasses the utilization of a final sweetening zone to transform these residual not easily extracted mercaptans to disulfides. This use of the final sweetening zone for these difficult streams is an alternative to the use of extremely long contact time in the extraction zone which, in general, is undesirable because of the consequential requirement for oversize equipment and/or low throughput.

Traditionally, the petroleum and chemical industries, the removal of mercaptans from various process materials, and/or streams has been a substantial problem. The reasons for desiring this removal are so well-known in the art, that it would be needless repetition to repeat them in detail here. Nonetheless, some of the ramifications of their presence are: corrosion problems, burning problems, catalytic poisoning problems, undesired side reaction problems, offensive odor problems, etc.

The methods that have been proposed for the solution of this removal problem can be catagorized into those that seek the absolute removal of mercaptan compounds or any derivatives of these compounds from the carrier stream or material, and those that seek only to convert the mercaptans into a less harmful derivative with no attendant attempt at removal of these less harmful derivatives. Solutions of the former type are generally labeled as "extraction" processes. Solutions of the latter type are generally labeled as "sweetening" processes. Prominent among the extraction processes is a process which depends for its effectiveness on the fact that mercaptans are slightly acidic in nature and in the presence of a strong base tend to form salts—called mercaptides—which have a remarkable high preferential solubility in a basic solution. Such a process has been found to be highly effective when the input stream is limited to those which contain low molecular weight mercaptans, primarily because these molecules do not have a large portion which is markedly oil-soluble and thus the mercaptan portion of the molecule, which is slightly acidic and consequently base-soluble, tends to dominate. However, the situation begins to reverse as the molecular weight of the mercaptan increases until a point is reached when the oil-soluble portion of the molecule reaches ascendancy. This is precisely the case in point when an attempt is made to apply this technique to organic streams containing large amounts of high molecular weight mercaptans—for instance, a kerosene stream.

Thus, a major problem that is encountered in the extraction of mercaptans from a high-boiling organic stream with an alkaline stream is a problem of solubility of a high molecular weight mercaptan in the extracting medium. The present invention provides a mechanism for effecting this extraction utilizing for this purpose a group of highly polar organic solvents, discussed in detail hereinafter, in combination with an alkaline solution. In addition, for those particularly difficult mercaptans which would require inordinate contact times to be effectively extracted from the organic stream, the present invention proposes to physically remove the major portion of the mercaptans in an extraction step and then to follow this by a final sweetening step in which these extraordinarily difficult mercaptans of high molecular weight are oxidized to disulfides by means of a specially tailored reactive environment as will be hereinafter explained.

Associated with the removal problem, indeed controlling of economic feasability of the continuous process, is the regeneration problem. This problem is produced by the fact that the class of polar-organic, alkaline solutions proposed for utilization in the process of the present invention are, in general, quite expensive and cannot within any degree of engineering feasibility, be cast aside once their extraction mission is completed. Thus, it is mandatory that they be regenerated for reuse in the process. By now it is firmly established in the art, that the most desirable means of regenerating these solutions is in oxidation reaction whereby the dissolved mercaptides are transformed to disulfides which are compounds that are not appreciably soluble in the alkaline solution, and thus they tend to form a separate organic phase which can generally be removed after coalescence by decantation. A preferred mechanism for effecting this oxidation is by an oxidizing agent in a catalytic environment that includes the presence of a phthalocyanine catalyst. This is particularly advantageous in the process of the present invention because use of this catalyst removes substantially all of the mercaptides that are present in the extracting stream such that the stream that is recycled back to the extraction zone will produce the maximum effective concentration gradient within the extraction zone.

Since it is well-known that the efficacy of an extractive agent is primarily determined by the difference between the equilibrium concentration of the material to be extracted and the initial concentration of this material in the extracting stream entering the extraction zone, the present invention insures that this latter term will remain close to zero no matter how many times the extracting agent is recycled to the extraction zone. Thus, the present invention promotes efficient and effective utilization of the extractive agents associated with the present process.

In the utilization of this phthalocyanine oxidation process to final sweeten a raffinate stream and to regenerate a mercaptide laden alkaline extract stream, particularly those containing substantial quantities of high molecular weight mercapto compounds, we have noted some difficulty with initial catalytic activity. As a result of our investigation into this initial deactivation phenomenon, we now believe that it is caused primarily by certain acidic surface active materials—such as naphthenic acids and alkyl phenols—which are normally present in sour organic streams and which tend to be partially extracted by the alkaline solution along with the mercaptans. These surface active materials apparently have the capability to adhere to the surface of the phthalocyanine catalyst and act as a barrier to the approach of the reactant material. Quite unexpectedly, we have found that the present invention tends to minimize this effect by utilization of a special class of materials that have the property of removing a substantial portion of these debilitating materials from the surface of the catalyst.

Still another problem encountered in the utilization of this phthalocyanine process in a regeneration operation and in a final sweetening operation is what might be characterized as a long-rang catalytic stability problem. This appears to involve the formation of a tar-like deposition on the surface of the catalyst. The exact nature of this material is not known at this time but it is believed to be a complex hydrocarbon product of surface active materials mentioned hereinbefore that, over a period of time, chokes off access to the catalytic surface. Perhaps, the best evidence for its existence is that a slurry of phthalocyanine catalyst on a carbon support, when utilized in a sweetening operation, initially is easily separable from a hydrocarbon phase that is being sweetened, but tends after a period of time to be carried over into the hydrocarbon phase as a colloidal dispersion that will no longer separate out the oil phase. This fact implies that certain organic compounds have become attached to the catalyst and changed its character from hydrophilic to hydrophobic. This coupled with the occasionally observed instability of the catalyst which is manifested by its frequent need for regeneration when sweetening high-boiling streams, we believe shows the formation of a catalytic deactivation deposition on the surface of the catalyst. The present invention minimizes this tar-forming phenomenon by the judicious choice of a polar organic solvent that retards the formation of this tar-like material, and consequently increases the stability of the phthalocyanine catalyst.

Therefore, it is a principal object of this invention to provide a combination process for the treatment of a sour organic stream containing a mercaptan component in order to recover a product of reduced mercaptan content and of reduced total sulfur compound content. A corollary objective is to increase the initial activity of the phthalocyanine catalyst that is utilized in a regeneration step and a final sweetening step of a mercaptan extraction/sweetening process. Another related objective is to stabilize a phthalocyanine catalyst used in the final sweetening of the organic raffinate stream and in the regeneration of an alkaline stream containing high molecular weight mercaptans. A further objective is to provide a combination process for the reduction of the mercaptan concentration of a sour organic stream containing high molecular weight mercaptans which involves the extraction of a portion of the mercaptans and the oxidation of a significant portion of the remainder to disulfides.

A still further objective is to provide a means of regenerating a high molecular weight mercaptide laden extraction stream such that effective and efficient utilization of the extractive agents is achieved.

In broad embodiment, the present invention involves a combination process for treating a sour organic stream containing at least one mercaptan component in order to generate a product of reduced mercaptan content which comprises the steps of: contacting, in an extraction zone, said sour organic stream with an alkaline solution containing a polar-organic solvent selected from the group consisting of dialkyl sulfoxides, amino alcohols, amino-hydroxy-alkyl ethers, alkyl amines, alkyl polyamines, alkyl amides and mixtures thereof; separating the resultant mixture to provide an organic phase of reduced mercaptan content and a mercaptide-rich, polar-organic, alkaline phase; contacting, in a regeneration zone, the mercaptide-rich, polar-organic, alkaline phase effluent from said extraction zone, with an oxidizing agent and with a phthalocyanine catalyst at oxidizing conditions effecting the conversion of a substantial portion of the mercaptide component in said effluent into disulfide; separating the resultant regeneration zone effluent to provide a substantially disulfide-free, polar-organic, alkaline phase and a disulfide phase; and recycling at least a portion of said disulfide-free, polar-organic, alkaline phase to said extraction zone to admix with said sour organic stream.

In another broad embodiment, the present invention relates to a combination process for treating a sour organic stream containing at least one mercaptan component in order to generate a product of reduced mercaptan content, which comprises the steps of: contacting, in an extraction zone, said sour organic stream with a first alkaline solution containing a polar organic solvent selected from the group consisting of dialkyl sulfoxides, amino alcohols, amino-hydroxy-alkyl ethers, alkyl amines, alkyl polyamines, and alkyl amides; separating the resultant mixture to provide an organic phase of reduced mercaptan content and a mercaptide-rich, polar-organic, alkaline phase; contacting, in a regeneration zone, the mercaptide-rich polar-organic, alkaline phase effluent from said extraction zone with an oxidizing agent and with a phthalocyanine catalyst at oxidizing conditions effecting the conversion of a substantial portion of the mercaptide component in said effluent into disulfide; separating the resultant regeneration zone effluent to provide a substantially disulfide-free, polar-organic, alkaline phase and a disulfide phase; recycling at least a portion of said disulfide-free, polar-organic, alkaline phase to said extraction zone to admix with said sour organic stream; contacting, in a sweetening zone, said organic phase of reduced mercaptan content effluent from said extraction zone with an oxidizing agent, with a phthalocyanine catalyst, and with a second alkaline solution containing a polar organic solvent selected from the group previously enumerated, at oxidizing conditions effecting the conversion of a substantial portion of the residual mercaptan component of said organic phase of reduced mercaptan content effluent into disulfide; separating said final sweetening zone effluent into a sweet organic phase product and a polar-organic, alkaline phase; and recycling this polar-organic, alkaline phase to said sweetening zone.

Specific embodiments of this invention relate to particularly preferred process conditions, concentrations of extractive agents and reactants, compositions of catalytic material, and mechanisms of effecting the process. These will be hereinafter discussed in the detailed analysis of the elements and mechanisms that can be employed in the practice of the present invention which is coupled with the detailed discussion of one particular embodiment of the present invention that is illustrated in the attached drawing.

Without limiting the scope and spirit of the appended claims by this explanation, it seems that the difficulty encountered in extracting high molecular weight mercaptans is primarily caused by the inability of the alkaline solution to attract the high molecular weight mercaptans because of the predominance of the organic portion of the molecule, and the consequential minimization of the effect of the polar part. But when a highly polar organic solvent is used in conjunction with an alkaline solution, the situation reverses and the polar portion of the mercaptan tends to be attracted into the polar phase where it loses the lightly held hydrogen atom and acquires a metal cation to form a salt which is soluble in the alkaline phase. Associated with this idea is the more unobvious one that an agent that promotes solubility of mercaptans in an alkaline phase may also have the property of attracting surface active materials, such as alkylphenols and naphthenic acids, from the surface of the phthalocyanine catalyst where these surface active materials tend to promote phthalocyanine catalyst deactivation by virtue of their ability to restrain or act as a barrier to, the approach of the reactive ingredients. We have found, now, a group of organic materials with these desired properties and believe that the essential characteristic of these materials is their highly polar nature which tends to attract the slightly acidic mercaptans from the organic phase while at the same time attracting, and tending to keep off the surface of the catalyst, the surface active materials previously mentioned which are also slightly acidic (N.B. both phenols and naphthenic acids are polarized to some degree). These materials also have the unexpected property of retarding the formation of a tar-like material on the surface of the phthalocyanine catalyst which heretofore has been the principal long-range deactivation mechanism. This latter effect is probably due to the ability of the highly polar-organic solvent to prevent or retard the approach of the surface active materials to the active sites of the catalyst, thus inhibiting the formation of the tar-like deposition which is believed to be a complex product of the surface active materials.

Before considering in detail the various ramifications of the present invention, it is convenient to define several of the terms and phrases used in this specification and in the appended claims. In those instances where temperatures are given to boiling ranges and boiling points, it is understood that they have reference to those which are obtained through use of Standard ASTM Distillation methods. The phrase "gasoline boiling range" as used herein refers to a temperature range having an upper limit of about 400° F. to about 425° F. The term "middle distillate range" is intended to refer to a temperature range above the gasoline range but having an upper limit of about 650° F.—included within this range would be fractions that are called in the industry heavy naphthas, fuel oils, jet fuel, etc. The term "kerosene" would also be a special case of a middle distillate range oil having an initial boiling point of about 300° F. to about 400° F., and an end boiling point of about 475° F. to about 550° F. The term "sweetening" as used herein denotes the process of treating a sour hydrocarbon fraction with an oxidizing agent that conditions designed to effect the oxidation of mercaptans to disulfides which are compounds of comparatively sweet odor. The term "mercaptan extraction" as used herein denotes the process of contacting a sour hydrocarbon stream with an appropriate solvent at conditions designed to physically remove mercaptans from the stream. The term "hydrocarbon fraction or distillate" is intended to refer to a portion of a petroleum crude, of a mixture of hydrocarbons, of a coal tar distillate, etc., that boils within a given temperature range. The term "polar solvent" refers to a solvent in which the molecules are characterized by a slight separation of the center of density of the positive charges and of the negative charges which gives rise to an electrical dipole; as a result of this dipole molecules which approach each other closely enough and with the proper orientation tend to adhere, the ends of unlike charges attracting each other. The term "surface active material" is used herein to refer to material that consists of molecules that have a large portion which is oil-soluble and a portion which is polar-medium soluble. The "liquid hourly space velocity" is defined to be the volume of the reference liquid flowing over a bed of catalyst per hour divided by the volume of the catalyst disposed within the reaction zone. The term "mercapto compound" is used here to describe the sulfhydryl group containing compounds such as hydrogen sulfide, the alkyl compounds—known as mercaptans and mercaptides, and aryl derivatives—known as thiophenols.

At this point it is evident that the process of the present invention involves the following essential elements: (1) a sour organic stream (2) a phthalocyanine catalyst, (3) an alkaline reagent, (4) a polar organic solvent, and (5) an oxidizing agent. It is, therefore, appropriate to consider each of these essential elements in detail.

The input sour organic streams for the process of the present invention can be any sour organic stream in which mercapto compounds are present, and it is desired to physically remove a portion of the mercapto compounds and, for special cases, to transform a portion of the remainder to disulfides. The novel process of the present invention is particularly applicable to the treatment of petroleum distillates and particularly sour gasoline, including cracked gasoline, straight run gasoline, natural gasoline, or mixtures thereof; naphthas; jet fuels; kerosenes; aromatic solvents; stove oils; range oils; fuel oils; etc. Since the present invention is particularly useful in the treatment of input streams that contain significant amounts of high molecular weight mercaptans, the input stream will more frequently be a middle distillate range oil such as a kerosene, jet fuel, stove oil, range oil, burner oil, gas oil, fuel oil, etc.

Any suitable phthalocyanine catalyst can be used in the present invention and preferably comprises a metal phthalocyanine. Particularly preferred metal phthalocyanines comprise cobalt phthalocyanine and vanadium phthalocyanine. Other metal phthalocyanines include iron phthalocyanine, copper phthalocyanine, nickel phthalocyanine, chromium phthalocyanine, etc. The metal phthalocyanine in general is not highly polar and, therefore, for improved operation is preferably utilized as a polar derivative thereof. A preferred polar derivative is the sulfonated derivative. Thus, a particularly preferred phthalocyanine catalyst comprises cobalt phthalocyanine sulfonate. Such a catalyst comprises cobalt phthalocyanine disulfonate and also contains cobalt phthalocyanine monosulfonate. Another preferred catalyst comprises vanadium phthalocyanine sulfonate. These compounds may be obtained from any suitable source or may be prepared in any suitable manner as, for example, by reacting cobalt or vanadium phthalocyanine with 20% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

The phthalocyanine catalyst used in the various embodiments of the present invention can be, if desired, composited with a suitable carrier material and used as a fixed bed or a slurry. This does not mean that the catalyst, in the extraction/sweetening embodiment, has to be present in both the regeneration zone and the final sweetening zone in the same form as the two zones can be functionally independent insofar as type of catalyst employed is concerned. The carrier should be insoluble in and substantially unaffected by the caustic solution and hydrocarbons under the conditions prevailing in the treatment zones. Activated charcoals are particularly preferred because of their high adsorptivity and stability under these conditions. Other carbon carriers include, coke, charcoal, which may be obtained from any suitable source including bone char, wood charcoal, charcoal made from coconuts. Other carriers include: silica as for example, sand, glass beads, etc., clays, and silicates including those synthetically prepared and naturally occurring; alumina; magnesia; etc.; or mixtures thereof.

The composite of phthalocyanine and carrier may be prepared in any suitable manner. In one method, the carrier may be formed in the particles of uniform or irregular size and shape, including spheres, pills, pellets, etc. And the carrier is intimately contacted with a solution of phthalocyanine catalyst. Aqueous, alcoholic, or alkaline solutions of the phthalocyanine catalyst are prepared and, in a preferred embodiment, the carrier particles are soaked, dipped, suspended, or immersed in the solution. In another method the solution may be sprayed onto, poured over or otherwise contacted with the carrier. Excess solution may be removed in any suitable manner and the carrier containing the catalyst is allowed to dry to room temperature, or is dried in an oven or by means of hot gasses passed thereover, or in any other suitable manner.

In general it is preferred to composite as much catalyst with the carrier as will form a stable composite, although a lesser amount may be so deposited if desired. In one preparation, 1% by weight of cobalt phthalocyanine sulfonate catalyst was composited with activated carbon by soaking granules of the carbon in the solution of phthalocyanine catalyst. In another method the catalyst support may be deposited in a treating zone and the phthalocyanine catalyst solution passed therethrough in order to form the catalyst composite in situ. If desired, the solution may be recycled one or more times in order to prepare the desired composite. In still another embodiment, the carrier may be deposited in the treating chamber and the chamber filled with the solution of the catalyst thereby forming the composite in situ.

When the phthalocyanine catalyst is present as a fixed bed or as a slurry on a carbon support the concentration of phthalocyanine catalyst may range from .1% to about 10.0% by weight of the catalytic composite and preferably about 1.0% by weight of the catalytic composite. When the catalyst is present in the form of a solution of the catalyst in the polar-organic alkaline solution the phthalocyanine catalyst is used in a range of from 5 to 1000 and preferably from about 10 to 500 p.p.m. by weight of polar-organic alkaline solution.

As pointed out hereinbefore, the process of the present invention involves the utilization of an alkaline reagent. Any appropriate alkaline reagent may be employed. A preferred reagent comprises an aqueous solution of an alkaline metal hydroxide such as sodium hydroxide solution, potassium hydroxide solution, etc. Other alkaline solutions include aqueous solutions of lithium hydroxide, cesium hydroxide, etc.—although in general, these hydroxides are more expensive and therefore are not preferred for commercial use. A particularly preferred alkaline solution is an aqueous solution of from 1 to about 50% by weight concentration of sodium hydroxide, and more preferably the sodium hydroxide concentration is within the range of about 4% to about 25% by weight concentration.

As hereinbefore set forth the alkaline solution used in the present invention contains substantial amounts of a polar organic solvent. Not every polar organic solvent can be used in the process of the present invention; for instance, a well-known polar organic solvent is methanol, and we have found that methanolic solutions not only do not improve the oxidation of higher molecular weight mercaptans but, in high enough concentrations, actually retard the oxidation of mercaptans. Therefore, the polar organic solvent that is admixed with the alkaline solution is selected from the group consisting of dialkyl sulfoxides, amino alcohols, amino-hydroxy-alkyl ethers, alkyl amines, alkyl polyamines, alkyl amides, and mixtures thereof. Typical sulfoxides are: dimethyl sulfoxide, diethyl sulfoxide, dipropyl sulfoxide, dibutyl sulfoxide, etc. Typical amino alcohols are: 2-amino-ethanol, 3-amino-1-propanol, 3-amino-2-propanol, 4-amino-1-butanol, 4-amino-2-butanol, 2-amino - 2' - hydroxydiethylamine, 3-amino-3'-hydroxydipropylamine, 2,2'-dihydroxydiethylamine, 3,3'-dihydroxydipropylamine, etc. Typical amino-hydroxy-alkyl ethers are: 2-(2-amino-ethoxy)-ethanol, 3-(3-aminoppropoxy)-propanol, 4-(4-aminobutoxy)-butanol, etc. Suitable alkylamines are: ethyl-amine, n-propylamine, i-propylamine, n-butylamine, i-butylamine, s-butylamine, N-methylethylamine, diethylamine, N-propylethylamine, N-methylpropylamine, N-ethylpropylamine, dipropylamine, etc. Typical alkyl polyamines for use in the present invention are: 1,2-diaminoethane, 1,3-diaminopropane, 1,4-diaminobutane, 1,5-diaminopentane, N,N'-dimethyl-1,2-diaminoethane, N,N'-diethyl 1-1,2-diaminoethane, 2,2'-diaminodiethylamine, 3,3'-diaminodipropylamine, etc. Typical alkyl amides are: formamide, dimethyl formamide, acetamide, N,N-dimethylacetamide, propionamide, etc. A particularly preferred polar organic solvent is dimethylsulfoxide. It is understood that the different polar organic solvents are not necessarily equivalent, but all of them will serve to accelerate the oxidation of mercapto compounds and improve the catayltic activity and stabiilty of the phthalocyanine catalyst.

The polar organic solvent is present within the alkaline solution in concentrations which may range from 1.0% to 90% by volume of the alkaline solution and more preferably from 5.0% to 50.0% by volume of the alkaline solution.

The oxidizing agent employed in the present invention is preferably air, but it is understood that any other suitable oxidizing agent may be employed, including oxygen or other oxygen containing gases. The amount of air must be stoichiometrically sufficient to effect oxidation of the mercapto compounds; but, since there is no particular problem caused by the use of an excessive amount of air, the amount used will generally be greatly in excess of the stoichiometric amount. Therefore, the amount of air used (at standard conditions) will generally range from about 5% of the volume of the stream that contains the mercapto compounds to about 500%, and preferably from about 10% to about 300%.

The present invention may be more clearly understood by reference to the accompanying drawing which illustrates one particular embodiment thereof. It is not intended, however, that the process of the present invention be unduly limited to the embodiment illustrated. In the drawing certain valves, control valves, coolers, pumps, compressors, etc., have either been eliminated or greatly reduced in number as not being essential to the complete understanding of the present process. The utilization of such miscellaneous items will be immediately recognized by one possessing the requisite skill within the art of petroleum processing technology.

Referring now to the drawing, the sour organic stream enters the extraction zone through line 3. When the sour organic stream contains hydrogen sulfide, it may be given a prior wash with an alkaline solution and preferably a low concentration caustic solution to remove hydrogen sulfide by conventional means, not illustrated. In the case here illustrated, extraction zone 7 comprises a vertical extraction zone, which preferably contains suitable packing material and/or conventional means to achieve adequate contact, including baffles, side to side pans, bubble trays, bubble decks, etc. In extraction zone 7, the sour organic stream is counter-currently contacted by an alkaline solution containing a highly polar organic solvent which enters the extraction zone via line 2 and is obtained as will be hereinafter explained. When desired, fresh alkaline solution may be introduced into the system by an extension of line 2. Also additional highly polar organic solvents may be added from time to time as needed through line 1, and line 2.

The function of extraction zone 7 is to bring about intimate contact between the sour organic stream and the polar organic alkaline stream such that the acidic organic compounds contained in the sour organic stream are preferentially dissolved in the alkaline solution, as hereinbefore explained in detail. The rates of flow of the sour organic stream in the alkaline solutions are adjusted so that the treated sour organic stream leaving extraction zone 7 via line 18 contains substantially less acidic organic components than the sour organic stream introduced via line 3.

Treatment of the sour organic stream with the alkaline solution in zone 7 is effected at any suitable temperature which is above the freezing point of the alkaline solution. Generally ambient temperature is satisfactory although in some cases, lower or higher temperatures may be used, ranging from as low as about 25° F. up to about 220° F. and preferably temperatures of about 80° F. to about 110° F. are employed. The pressure that is utilized within the zone ranges from about ambient up to about 300 pounds per square inch gage. Pressure employed is more desirably within the range of from about 75 p.s.i.g. to about 120 p.s.i.g.

The alkaline solution containing the extracted acidic organic components leaves extraction zone 7 via line 5 and is introduced into heater 21. The function of heater 1 is to raise the temperature of the alkaline stream about 10° F. to about 50° F. For instance, when the rich alkaline solution from the extraction zone is at about 120° F., heater 21 will be employed to raise the temperature of the stream to about 125° F. This heating of the rich alkaline stream serves to accelerate the subsequent oxidation reaction.

The heated effluent from heater 21 passes through line 24 into regeneration zone 9. In the drawing, the introduction of the rich caustic stream is shown as taking place in the upper regions of the regeneration zone such that it flows downwardly. In another embodiment not illustrated, the rich alkaline solution is introduced in such a manner that it flows upwardly. Air is introduced into regeneration zone 9 via line 4. Another possibility not illustrated would be introducing the air into line 24 to admix with the rich alkaline stream before the resultant mixture is introduced in the regeneration zone. The function of regeneration zone 9 is to oxidize the mercaptides contained in the rich alkaline stream to disulfides in order to regenerate the alkaline stream. As pointed out hereinbefore, this regeneration operation is performed in the presence of a phthalocyanine catalyst. This phthalocyanine catalyst may be present in the regeneration zone as a solution (as an emulsion), as a slurry of the catalyst on a suitable support, or as a fixed bed of phthalocyanine catalyst on a carrier material.

Regeneration zone 9 is generally operated at a temperature corresponding to the tmperature of the entering rich alkaline solution which in a typical embodiment would be about 125° F. The pressure that is maintained in regeneration zone 9 is generally substantially less than that utilized in extraction zone 7. For instance, in an embodiment wherein extraction zone 7 is maintained at 100 p.s.i.g., the regeneration zone would be operated at approximately 50 to 55 p.s.i.g.

As explained previously, the presence of the polar organic solvent within regeneration zone 9 will have several significant effects. Outstanding among these will be the improved activity and stability of the phthalocyanine catalyst employed within regeneration zone 9, as hereinbefore explained.

The regenerated alkaline solution, excess air, and disulfides are removed from regeneration zone 9 via line 10 and introduced into separating zone 12. In order to coalesce the disulfides and enable their effective separation a hydrocarbon wash stream, such as a naphtha, may be introduced into line 10 via line 11, there to admix with the effluent from the regeneration zone in such a manner as to extract the disulfides which being essentially non-polar substances have little affinity for the alkaline solution and are preferentially dissolved in the hydrocarbon solvent. In another embodiment not illustrated, this coalescence of the disulfides can be accomplished by passing the alkaline solution through a bed of sand, straw, glass, wool, etc.

The function of separating zone 12 is to bring about a phase separation between the polar-organic, alkaline stream and the disulfide rich hydrocarbon stream. Excess air is removed from separating zone 12 via line 13. The disulfide rich phase is removed via line 17. And the essentially disulfide-free, polar-organic, alkaline stream is removed via line 14. It is especially to be noted that this polar-organic, alkaline stream will have an extremely low concentration of mercaptans, as contrasted with the results obtained by using other possible means of regeneration, and as such will have maximum extractive capabilities when recycled via line 14, line 2 into extraction zone 7. This is primarily due to the fact, as previously explained, that the difference between the equilibrium concentration of mercaptan and the entering concentration is a measure of the extractive driving force.

Separating zone 12 will be operated at a temperature and pressure which essentially correspond to those maintained in regeneration zone 9.

Returning now to an examination of extraction zone 7, it can be seen that the organic phase effluent passes by way of line 18 and line 6 into final sweetening zone 8. Air is also introduced in the final sweetening zone 8 via line 4 and line 6. A polar organic, alkaline solution is also introduced into final sweetening zone 8 via line 20 and line 6. The function of final sweetening zone 8 is to oxidize the mercaptans remaining in the organic phase effluent from extraction zone 7. These mercaptans are essentially the ones that are the most difficult to extract, primarily because of their high molecular weight, and, perhaps of the inevitable inefficiency associated with the extraction operation.

As hereinbefore set forth, the phthalocyanine catalyst that is present within final sweetening zone 8 may be an emulsion or solution, a slurry of a phthalocyanine catalyst on a suitable support, or a fixed bed of phthalocyanine catalyst on a carrier material.

The temperature and pressure maintained within final sweetening zone 8 are essentially the same as those previously enumerated for extraction zone 7. The time of contact in the final sweetening zone will be set to give the desired reduction of mercaptan content and may range from about 1 minute to about 2 hours or more, depending upon the size of the final sweetening zone, and, the amount of catalyst therein and the particular sour organic stream being treated.

The effluent from final sweetening zone 8 is withdrawn through line 15 and passed into separating zone 23. Excess air is removed from separating zone 23 via line 16. In separating zone 23, a phase separation takes place and the treated sour organic stream is withdrawn via line 19. The polar-organic, alkaline solution is withdrawn from separating zone 23 via line 22 and recycled to final sweetening zone 8 for further use therein. Fresh polar-organic, alkaline solution may be added to the process as needed via line 22.

In still another embodiment, the phthalocyanine catalyst is present within the final sweetening zone as a fixed bed on an appropriate support, and the alkaline solution containing a polar organic solvent is charged intermittently such that the amount of the polar-organic, alkaline solution entrapped in the bed fluctuates within a desired range. This intermittent process is preferably accomplished first, by charging the polar-organic, alkaline solution, either in admixture with the organic phase effluent from regenerattion zone 7 or not, to the bed until such time that the bed becomes saturated with the solution; second, by terminating the flow of the polar-organic, alkaline solution and charging only the sour organic stream and air; and finally, by repeating the polar-organic, alkaline solution introduction at an interval of time that is determined by the residual alkalinity of the bed as measured by the mercaptan concentratiton of the organic effluent from the final sweetening zone.

Although it is not shown in the drawing, the sweetened products leaving separating zone 23 may be further processed by water washing to remove any entrained caustic solution. In addition, this treated organic stream may be further processed using conventional techniques to recover a substantial amount of any polar organic solvent that has dissolved in it.

It is to be kept in mind that the exact selection of the particular variables of this process are at least partially dependent upon the physical and/or chemical characteristics of the sour organic stream being subjected to the present process and as such have to be individually determined for each particular type of input stream.

The following examples are given to illustrate further the process of the present invention and to indicate the benefits to be afforded by the utilization thereof. It is understood that the examples are given for the sole purpose of illustration and are not considered to limit the generally broad scope and spirit of the appended claims.

EXAMPLE I

A commercial kerosene having an initial boiling point of about 350° F., and an end boiling point of about 550° F., and containing about 500 parts per million of mercaptan sulfur is introduced into an extraction zone similar to that shown in the attached drawing. In extraction zone 7, the commercial kerosene is countercurrently contacted with a polar organic, alkaline solution which comprises 33.3% by volume of dimethyl sulfoxide, 50% by volume of a 20% by wt. sodium hydroxide solution, and 16.7% water in which sufficient phthalocyanine disulfate has been dissolved to yield 75 p.p.m. of catalyst based on the total caustic/dimethyl sulfoxide solution. The rates of flow of the respective solutions are adjusted such that the amount of the polar-organic, alkaline solution being introduced into the zone is approximately 20% of the sour kerosene introduced into the zone. The extraction zone is maintained at a temperature of 100° F. and a pressure of about 100 p.s.i.g. The polar-organic, alkaline solution effluent from the extraction zone passes via line 5 into heater 21 wherein its temperature is raised to 125° F. at a pressure of 50 p.s.i.g. The heated rich caustic stream is then introduced via line 24 into regeneration zone 9. Regeneration zone 9 is maintained at a temperature of 125° F. and a pressure of 50 p.s.i.g. Air is introduced in regeneration zone 9 in an amount of approximately 300 percent by volume of the rich alkaline solution. The residence time of the polar-organic, alkaline solution within regeneration zone 9 is approximately 10 minutes.

The effluent from regeneration zone 9 is withdrawn via line 10 and introduced into separating zone 12. In addition a small amount of naphtha is introduced via line 11 into line 10 where it admixes with the effluent from regeneration zone and it is passed into separating zone 12. A disulfide phase is taken off from separating zone 12 via line 17, and a substantially mercaptide-free, polar-organic, alkaline solution is removed from separating zone 12 via line 14 and recycled via line 2 to extraction zone 7 for further use therein. The time of residence of the alkaline stream within separating zone 12 is approximately 90 minutes.

The organic phase effluent from extraction zone 7 is recovered via line 18 and is found to be substantially reduced in total sulfur compound content.

The operation of the process under these conditions is found to be quite stable and no significant loss of catalyst is experienced.

This example demonstrates that the present invention will yield excellent extraction results when operating on a middle distillate stream whereas in the past extraction operations have been plagued by the inability of the extracting medium to remove higher boiling mercaptan compounds.

EXAMPLE II

This example illustrates the embodiment of the invention wherein the organic phase effluent from the extraction zone is further sweetened in order to convert residual difficultly extracted mercaptans to disulfides. Once again the process employed is quite similar to that shown in the attached drawing.

The commercial kerosene of the type employed in the previous example is treated in the manner explained in Example I in order to extract a significant portion of the mercaptans contained within the stream. But it is desired to further sweeten the stream and reduce the mercaptan concentration down to very low levels such that a sweet product is obtained. The criterion of sweetness that is employed here is that associated with the traditional "doctor sweet" test. The effluent from extraction zone 7 that has been treated in accordance with the procedure outlined in Example I is passed via line 18 into final sweetening zone 8. The catalyst that is present within final sweetening zone 8 is a fixed bed of cobalt phthalocyanine monosulfonate on a charcoal support. It is prepared by the addition of 1 gram of cobalt phthalocyanine monosulfonate in methanol for each 99 grams of carbon support (which is a commercial product marketed under the trade name of "Nuchar type WA" and is supplied in granules of 30 to 40 mesh). The mixture is then stirred for 15 minutes and is allowed to stand until all color is absorbed on the carbon. The catalyst is then filtered out and is dried to constant weight at 120° C. This procedure results in the catalytic composite containing about 1% by weight of cobalt phthalocyanine monosulfate.

The recycled caustic solution entering final sweetening zone 8 via line 20 and line 6 consists of 16% by volume dimethylsulfoxide and 84.0% by volume of an 8% by weight solution of sodium hydroxide.

The organic phase effluent from extraction zone 7 that enters final sweetening zone 8 via line 18 and line 6 is flowing at a 0.1 liquid hourly space velocity. The recycle caustic stream is also pumped at a 0.1 liquid hourly space velocity. The final sweetening zone is maintained at a temperature of 100° F. and a pressure of 95 p.s.i.g. Air enters the system via line 6 at a rate which corresponds to about 10% by volume of the extraction zone effluent. The time of contact of the organic stream with the cobalt phthalocyanine catalyst is approximately 5 minutes.

The effluent from final sweetening zone 8 is passed via line 15 into separating zone 23. The residence time of the kerosene within separating zone 23 is approximately 30 minutes. The kerosene then is decanted off via line 19 and is found to contain less than 10 p.p.m. of mercaptan sulfur.

The operation is found to be quite stable with no observed loss of catalyst activity due to formation of a tar-like material on the catalyst.

We claim as our invention:

1. A combination process for treating a sour organic stream containing at least one mercaptan component in order to generate a product of reduced mercaptan content, which comprises the steps of:
    (a) contacting, in an extraction zone, said sour organic stream with an alkaline solution containing a polar organic solvent selected from the group consisting of dialkyl sulfoxides, amino alcohols, amino-hydroxyalkyl ethers, alkyl amines, alkyl polyamides, and alkyl amides; and separating the resultant mixture to provide an organic phase of reduced mercaptan content and a mercaptide-rich, polar-organic, alkaline phase;
    (b) contacting, in a regeneration zone, the mercaptide-rich, polar-organic, alkaline phase effluent from said extraction zone, with an oxidizing agent and with a phthalocyanine catalyst at oxidizing conditions effecting the conversion of a substantial portion of the mercaptide component in said effluent into disulfide;

(c) separating the resultant regeneration zone effluent to provide a substantially disulfide-free, polar-organic, alkaline phase and a disulfide phase; and (d) recycling at least a portion of said disulfide-free, polar-organic, alkaline phase to said extraction zone to admix with said sour organic stream.

2. The process of claim 1 further characterized in that said sour organic stream is a hydrocarbon fraction boiling above the gasoline range.

3. The process of claim 1 further characterized in that said phthalocyanine catalyst is selected from the group consisting of cobalt phthalocyanine sulfonates and vanadium phthalocyanine sulfonates.

4. The process of claim 1 further characterized in that said polar-organic solvent is dimethyl sulfoxide.

5. The process of claim 1 further characterized in that said polar-organic solvent is dimethylformamide.

6. The process of claim 1 further characterized in that said polar-organic solvent is 2-aminoethanol.

7. The process of claim 1 further characterized in that said polar-organic solvent constitutes 5% by volume to about 50% by volume of said alkaline solution containing a polar-organic solvent.

8. The process of claim 1 further characterized in that said organic phase of reduced mercaptan content effluent from said extraction zone is subjected to a final sweetening operation, in a sweetening zone, which comprises contacting said effluent with an oxidizing agent, with a phthalocyanine catalyst, and with an alkaline solution containing a polar-organic solvent selected from the group enumerated in claim 1, at oxidizing conditions effecting the conversion of a substantial portion of the residual mercaptan component of said effluent into disulfides, and separating said final sweetening zone effluent into a sweet organic phase product and a polar-organic, alkaline phase.

9. The process of claim 8 further characterized in that said phthalocyanine catalyst is composited with a carrier material and is maintained within said sweetening zone or a fixed bed.

10. The process of claim 8 further characterized in that said polar-organic, alkaline phase is recycled to said final sweetening zone to admix with said organic phase effluent of reduced mercaptan content.

References Cited

UNITED STATES PATENTS

| 2,426,087 | 8/1947 | Fetterly | 208—235 |
| 3,052,626 | 9/1962 | Ferrara | 208—204 |
| 3,184,405 | 5/1965 | Hoover | 208—240 |
| 3,213,155 | 10/1965 | Schriesheim et al. | 208—204 |

FOREIGN PATENTS 638,287  3/1962  Canada.

DELBERT E. GANTZ, *Primary Examiner.*

G. J. CRASANAKIS, *Assistant Examiner.*